(12) United States Patent
Kwun et al.

(10) Patent No.: US 8,320,965 B2
(45) Date of Patent: Nov. 27, 2012

(54) APPARATUS AND METHOD FOR SAVING POWER OF FEMTO BASE STATION IN WIRELESS COMMUNICATION SYSTEM

(75) Inventors: Jong-Hyung Kwun, Seongnam-si (KR); Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 12/454,535

(22) Filed: May 19, 2009

(65) Prior Publication Data
US 2009/0285143 A1   Nov. 19, 2009

(30) Foreign Application Priority Data
May 19, 2008  (KR) .................. 10-2008-0045964

(51) Int. Cl.
*H04M 1/00* (2006.01)
*H04B 1/38* (2006.01)
(52) U.S. Cl. ........................ 455/561; 455/574
(58) Field of Classification Search .......... 455/561, 455/574
See application file for complete search history.

(56) References Cited

U.S. PATENT DOCUMENTS

| 6,622,251 | B1 * | 9/2003 | Lindskog et al. ............. 713/300 |
| 2004/0219955 | A1 | 11/2004 | daCosta |
| 2005/0054389 | A1 * | 3/2005 | Lee et al. ..................... 455/574 |
| 2007/0066273 | A1 * | 3/2007 | Laroia et al. ............... 455/343.2 |
| 2007/0142020 | A1 | 6/2007 | Rotzoll |
| 2009/0196266 | A1 * | 8/2009 | Wu et al. ..................... 370/338 |

OTHER PUBLICATIONS

International Search Report dated Dec. 30, 2009 in connection with PCT Application No. PCT/KR2009/002632.

* cited by examiner

*Primary Examiner* — Steven Lim

(57) ABSTRACT

An apparatus and a method for transiting an operation mode of a femto base station in a wireless communication system are provided. The method includes, in a sleep mode, confirming whether operation transition request information is received from at least one terminal; and when receiving the operation transition request information from the terminal, entering an active mode. Thus, the power consumption of the femto base station can be reduced and the interference caused by the operation of the femto base station can be mitigated.

29 Claims, 13 Drawing Sheets

APPARATUS AND METHOD FOR SAVING POWER OF FEMTO BASE STATION IN WIRELESS COMMUNICATION SYSTEM

PRIORITY

The present application claims the benefit under 35 U.S.C. §119(a) to a Korean patent application filed in the Korean Intellectual Property Office on May 19, 2008 and assigned Serial No. 10-2008-0045964, the entire disclosure of which is hereby incorporated by reference.

TECHNICAL FIELD OF THE INVENTION

The present invention relates generally to an apparatus and a method for saving power of a femto base station and reducing interference caused when operating the femto base station in a wireless communication system. More particularly, the present invention relates to an apparatus and a method for transiting a femto base station in a sleep mode to an active mode in a wireless communication system.

BACKGROUND OF THE INVENTION

In a wireless cellular communication system, a geographical condition in a cell, a distance between a terminal and a base station, or movement of the terminal may deteriorate a channel condition and block the smooth communication between the terminal and the base station. For example, even in a service coverage of the base station, a building such as office building or a residence forms a shadow area.

In this respect, the wireless communication system provides a femtocell service to address the service problem in the shadow area and to offer a high-rate data service. Herein, the femtocell indicates a service coverage of a small base station that accesses a mobile communication core network over an indoor broadband network. Hereinafter, the small base station is referred to as a femto base station.

Since the femto base station uses a commercial broadband network installed indoor such as Digital Subscriber Loop (DSL) or cable modem, as a backhaul, users can install the femto base station by themselves.

As the femto base station is installed by the user in person inside the house, the power for the femto base station should be supplied directly from the house or the office. Additionally, since a plurality of femto base station may reside in a service coverage of a macro base station, the operation of the femto base station can interfere with terminals of the other femto cells or terminals of the macro cell.

Thus, what is needed is a method for saving the power of the femto base station and mitigating the interference caused by the operation of the femto base station in the wireless communication system which provides the femtocell.

SUMMARY OF THE INVENTION

To address the above-discussed deficiencies of the prior art, a primary aspect of the present invention is to address at least the above mentioned problems and/or disadvantages and to provide at least the advantages described below. Accordingly, an aspect of the present invention is to provide an apparatus and a method for reducing a power consumption of a femto base station in a wireless communication system.

Another aspect of the present invention is to provide an apparatus and a method for mitigating interference caused when a femto base station is operated in a wireless communication system.

Yet another aspect of the present invention is to provide an apparatus and a method for transiting a femto base station in a sleep mode to an active mode under control of a terminal in a wireless communication system.

Still another aspect of the present invention is to provide an apparatus and a method for transiting a femto base station in a sleep mode to an active mode under control of a terminal when a femtocell is located in a macro cell in a wireless communication system.

A further aspect of the present invention is to provide an apparatus and a method for transiting a femto base station in a sleep mode to an active mode under control of a terminal when a femtocell is located outside a macro cell in a wireless communication system.

According to one aspect of the present invention, a method for transiting an operation mode of a femto base station in a wireless communication system includes in a sleep mode, confirming whether operation transition request information is received from at least one terminal; and when receiving the operation transition request information from the terminal, entering an active mode.

According to another aspect of the present invention, a method for controlling an operation mode transition of a femto base station at a macro base station in a wireless communication system includes acquiring location information of at least one femto base station in a macro cell and at least one terminal in the macro cell; when there exists a terminal traveling in a cell of the femto base station or adjacent to the cell of the femto base station among the at least one terminal, confirming an operation mode of the femto base station; and when the femto base station is in a sleep mode, instructing the terminal traveling in the cell of the femto base station or adjacent to the cell of the femto base station, to change the operation mode of the femto base station.

According to yet another aspect of the present invention, a method for controlling an operation mode transition of a femto base station at a terminal in a wireless communication system includes determining whether to transit the femto base station of a sleep mode to an active mode; and when determining to transit the femto base station to the active mode, transmitting operation transition request information to a corresponding femto base station.

According to still another aspect of the present invention, an apparatus of a femto base station for transiting an operation mode in a wireless communication system includes a receiver for receiving a signal using a radio resource; a transmitter for sending a signal using a radio resource; and a controller for controlling to transit to an active mode when operation transition request information is received from at least one terminal through the receiver in a sleep mode.

According to a further aspect of the present invention, an apparatus of a macro base station for controlling an operation mode transition of a femto base station in a wireless communication system includes a location information confirmer for acquiring location information of at least one femto base station in a macro cell and at least one terminal in the macro cell; a location comparator for comparing the location information of the femto base station with the location information of the terminal; a controller for, when there exists a terminal traveling in a cell of the femto base station or adjacent to the cell of the femto base station among the at least one terminal, instructing an operation mode transition of the femto base station to the terminal; and a transmitter for sending operation mode transition indication message of the femto base station to the terminal under the control of the controller.

According to a further aspect of the present invention, an apparatus of a terminal for controlling an operation mode transition of a femto base station in a wireless communication system includes a receiver for receiving a signal; a controller for determining whether to transit the femto base station of a sleep mode to an active mode; and a transmitter for, when the controller determines to transit the femto base station to the active mode, transmitting operation transition request information to a corresponding femto base station.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for saving power of a femto base station and mitigating interference caused by operating the femto base station in a wireless communication system.

Hereinafter, the femto base station serves as one of an open access femto base station, a Closed Subscriber Group access (CSG) femto base station, and a hybrid access femto base station, depending on limitation of an accessible terminal. The open access femto base station can be used by any terminals subscribed to a corresponding mobile communication service. The CSG femto base station can be used only by terminals designated by agreement between an installer of the femto base station and a mobile communication service provider. The hybrid access femto base station supports both of the open access and the CSG access. That is, the hybrid femto base station functions as the CSG femto base station with respect to the terminals permitted to access the femto base station and functions as the open access femto base station with respect to other terminals. The hybrid femto base station controls allowance of the terminals permitted to access the femto base station to access prior to the other terminals. The hybrid femto base station may restrict the amount of air resources allocable to the terminals not permitted to access, in order to guarantee the service of the terminals permitted to access the femto base station.

Figure 1:
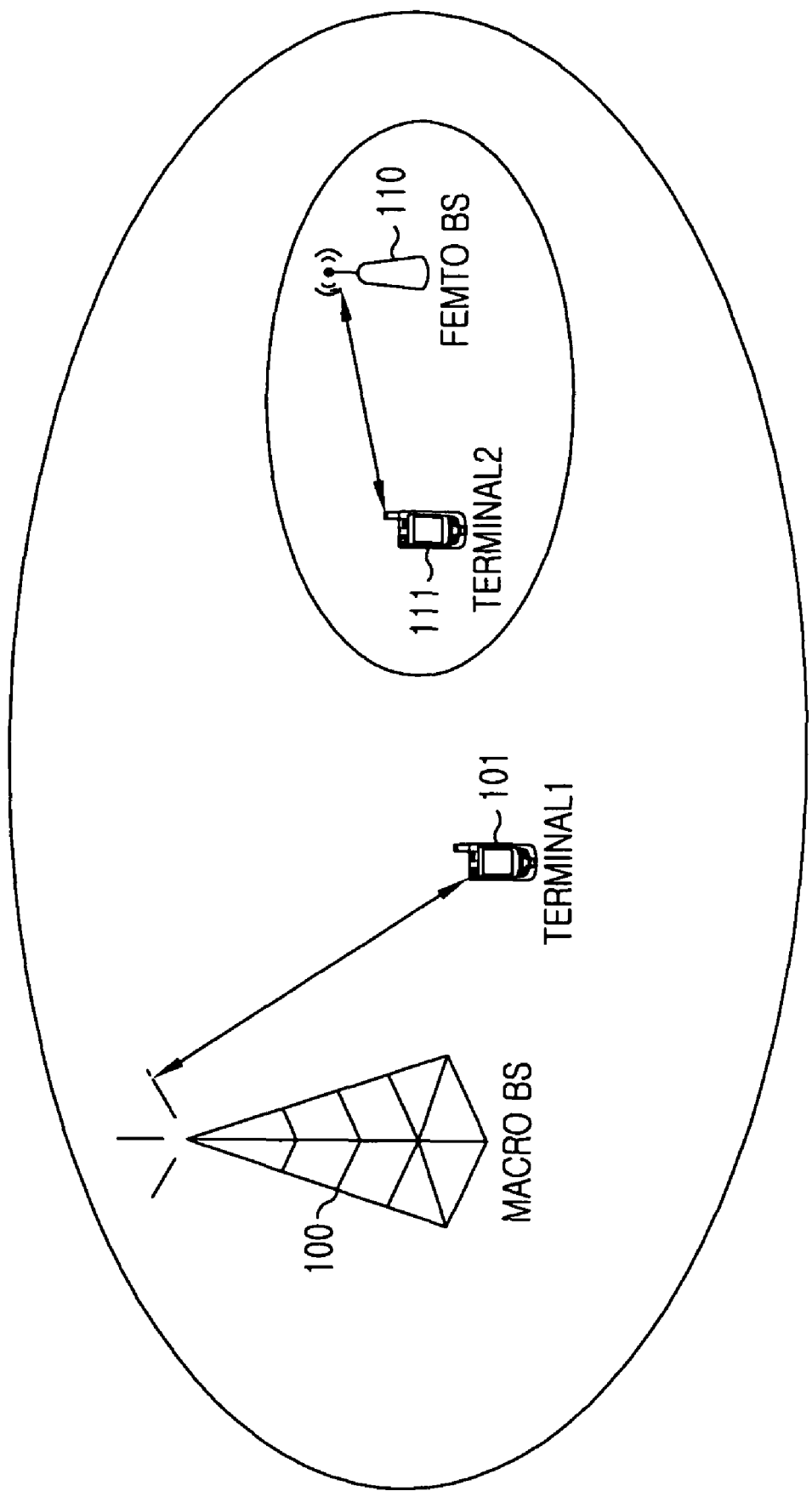
FIG. 1 illustrates a wireless communication system including a femtocell according to an exemplary embodiment of the present invention.

When a femtocell is located in a macro cell in the wireless communication system, the wireless communication system is configured as shown in FIG. 1.

FIG. 1 depicts a wireless communication system including a femtocell according to an exemplary embodiment of the present invention.

In FIG. 1, a macro base station 100 manages one macro cell. At least one femtocell managed by at least one femto base station 110 can be located in the macro cell.

A first terminal 101, which travels in the macro cell but outside the femtocell, communicates by accessing to the macro base station 100. When the first terminal 101 moves into the femtocell, the first terminal 101 communicates by accessing the femto base station 110.

A second terminal 111, which travels in the femtocell, communicates by accessing the femto base station 110. When the second terminal 111 moves out of the femtocell, the second terminal 111 communicates by accessing the macro base station 100.

In such embodiment, the first terminal 101 and the second terminal 111, within the femtocell, communicate by accessing to the femto base station 110. In this case, the femto base station 110 acts as the open access femto base station or the hybrid femto base station.

Alternatively, when the femto base station 110 is the CSG femto base station, the first terminal 101 and the second terminal 111 may not access the femto base station 110 unless they are registered to the femto base station 110 even within the femtocell. For example, when the first terminal 101 and the second terminal 111 are not registered to the femto base station 111, the first and second terminals 101, 111 need to access the macro base station 100, even when located within the femto cell for the communication.

Figure 2:
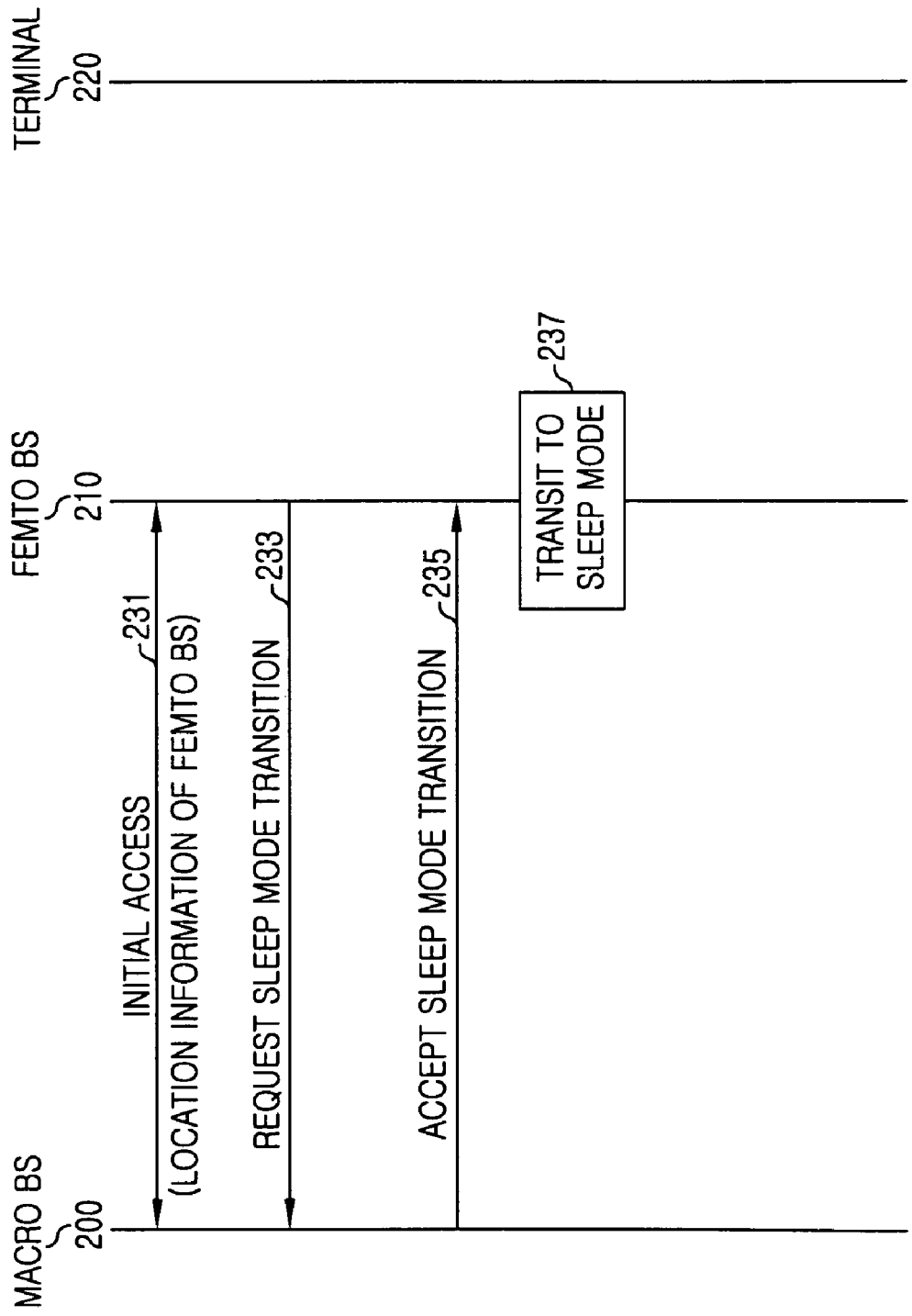
FIG. 2 illustrates a transition to a sleep mode of a femto base station in a wireless communication system according to an exemplary embodiment of the present invention.

When no terminal access to the femto base station exists and no accessible terminal over a reference time, the femto base station enters a sleep mode as shown in FIG. 2, to save its power and to mitigate interference caused by operating the femto base station.

FIG. 2 depicts the transition of the femto base station to the sleep mode in the wireless communication system according to an exemplary embodiment of the present invention.

When the femto base station 210 is initially installed in FIG. 2, the femto base station 210 transmits its location information and information required to function as the base station to the macro base station 200 in step 231. For example, the femto base station 210 transmits its location information and the information required to function as the base station to the macro base station 200 using radio resources. Alternatively, the femto base station 210 may transmit its location information and the information required to function as the base station to the macro base station 200 through the backhaul. Herein, the information required to function as the base station includes Radio Frequency (RF) information, physical layer (PHY) information, Media Access Control (MAC) information, and upper layer information. The system components include a home agent, a Dynamic Host Configuration Protocol (DHCP) server, an Authentication Authorization and Accounting (AAA) server, and so forth. When the femto base station 210 acts as the CSG femto base station, the femto base station 210 transmits its location information and the information required to function as the base station to the macro base station 200, together with a list of its registered terminals.

When there exist no accessed terminal and no accessible terminal over the reference time, the femto base station 210 reports the transition to the sleep mode to the macro base station 200 in step 233. For example, the femto base station 210 sends a sleep mode transition request message FEMTO-SLEEP-REQ to the macro base station 200. Herein, the sleep mode transition request message includes at least one of uplink resource information, transmission timing information, transmit power information, and dedication access preamble information to be used for the terminal to send the operation mode request message to the femto base station 210 of the sleep mode.

Upon receiving the sleep mode request message, the macro base station 200 sends a response message FEMTO-SLEEP-RSP to the femto base station 210 in response to the sleep mode transition in step 235. The macro base station 200 stores the information to be used for the terminal of the sleep mode request message to send the operation transition request message to the femto base station 210 of the sleep mode.

Receiving the response message for the sleep mode transition request, the femto base station 210 enters the sleep mode in step 237.

Although it is not illustrated, when the location information is changed, the femto base station 210 in the active mode transmits its changed location information to the macro base station 200. If the femto base station 210 acts as the CSG femto base station and its location information or its registered terminal list is changed, the femto base station 210 can send the changed information to the macro base station 200. Alternatively, in the active mode, the femto base station 210 may periodically transmit its location information to the macro base station 200.

As stated above, when transiting to the sleep mode, the femto base station 210 can operate in two modes. For example, in the sleep mode, the femto base station 210 aborts transmission and the reception and merely receives data on a periodic basis. That is, the femto base station 210, in the sleep mode, wakes up only for a preset duration (on-duration) and confirms whether the operation transition request message is received from the terminal, while omitting system information transmission, frame synchronization information transmission, preamble transmission, resource allocation information transmission, and data delivery. Alternatively, the femto base station 210 in the sleep mode may stop only the transmission and continue the reception. Hereinafter, the periodic reception of the femto base station in the sleep mode after stopping both of the transmission and the reception is referred to as a first sleep mode, and the termination of the transmission alone is referred to as a second sleep mode.

When entering the sleep mode, the femto base station transits to the active mode under the control of the terminal that intends to access, in order to sustain the service continuity of the terminal.

Now, various embodiments provide an operating method of the macro base station to control the femto base station of the sleep mode to transit to the active mode under the control of the terminal. It is assumed that the femto base station conforms to the CSG scheme.

Figure 3:
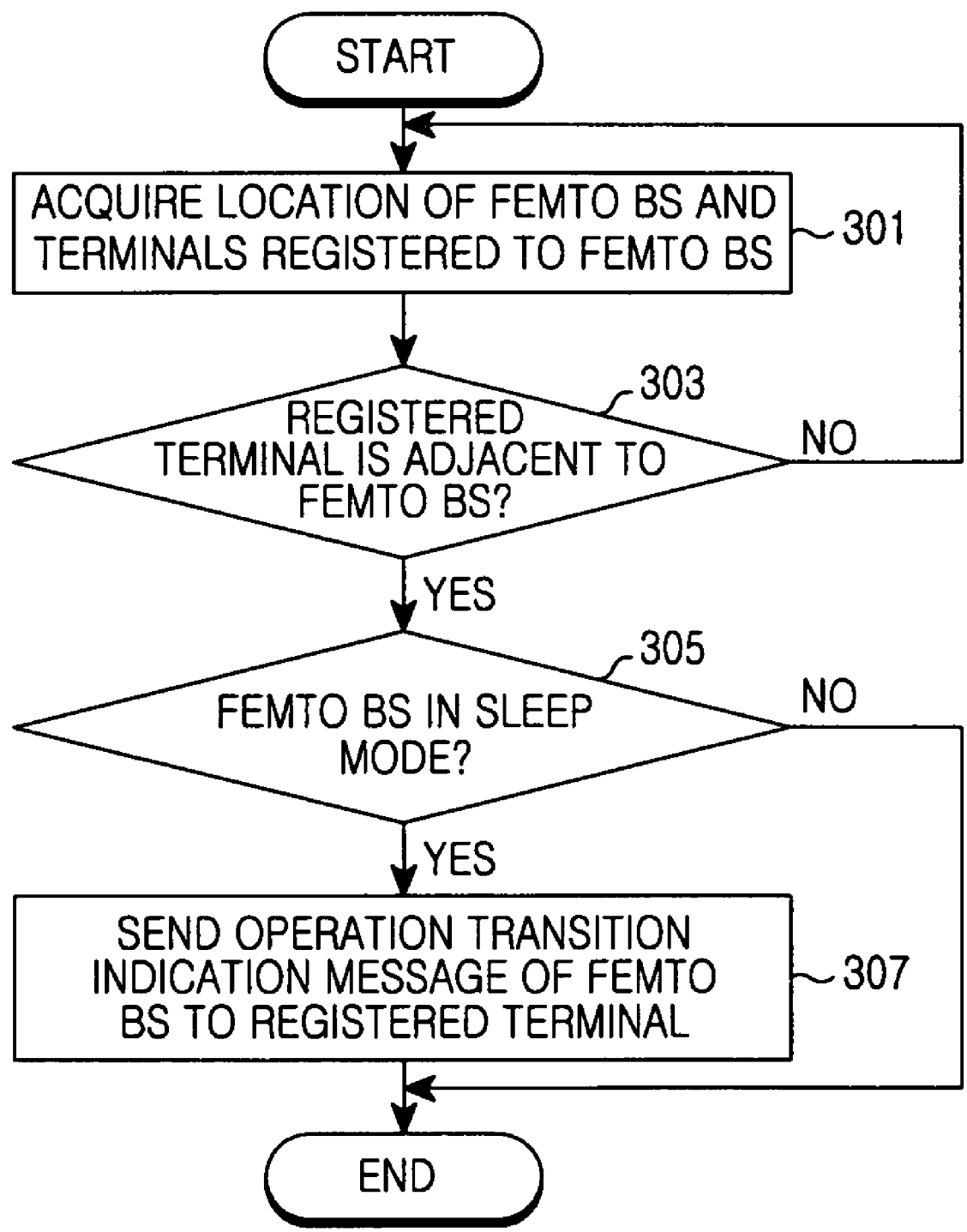
FIG. 3 illustrates a method of a macro base station for transiting the femto base station to an active mode in the wireless communication system according to an exemplary embodiment of the present invention.

FIG. 3 illustrates a flowchart of a method of the macro base station for transiting the femto base station to the active mode in the wireless communication system according to an exemplary embodiment of the present invention.

In step 301, the macro base station confirms the location information of the femto base station and the location information of the terminals registered to the femto base station. For example, the macro base station receives the location information from the femto base station and the terminals registered to the femto base station. Additionally and alternatively, the macro base station may measure the location information of the terminals registered to the femto base station.

In step 303, the macro base station confirms whether there exists a terminal that is located adjacent to the cell of the femto base station or moves into the cell of the femto base station among the terminals registered to the femto base station.

When there is no terminal located adjacent to the cell of the femto base station or moves into the cell of the femto base station, the macro base station returns to step 301 and confirms the location information of the femto base station and the terminals registered to the femto base station. That is, to detect the terminal that is located adjacent to the cell of the femto base station or moves into the cell of the femto base station, the macro base station reconfirms the location information of the femto base station and the terminals registered to the femto base station.

When detecting the terminal traveling adjacent to the cell of the femto base station or moving into the cell of the femto base station, the macro base station confirms the operation mode of the femto base station in step 305.

When the femto base station is in the active mode, the macro base station finishes this process. In doing so, the macro base station may control the terminal traveling adjacent to the cell of the femto base station or moving into the cell of the femto base station to hand over to the femto base station.

When the femto base station is in the sleep mode, the macro base station sends a message directing the operation transition of the femto base station to the terminal in step 307. Herein, the message includes information to be used for the terminal to send the operation transition request message to the femto base station of the sleep mode. For example, when the terminal accesses the femto base station using the dedication access scheme, the message includes uplink resource information, transmission timing information, transmit power information, and dedication access preamble information that are used for the terminal to send the operation transition request message to the femto base station of the first sleep mode. When the terminal accesses the femto base station using a random access scheme, the message does not include the dedication access preamble. Also, when the femto base station is in the second sleep mode, the message does not include the transmission timing information.

Next, the macro base station finishes this process.

Figure 4:
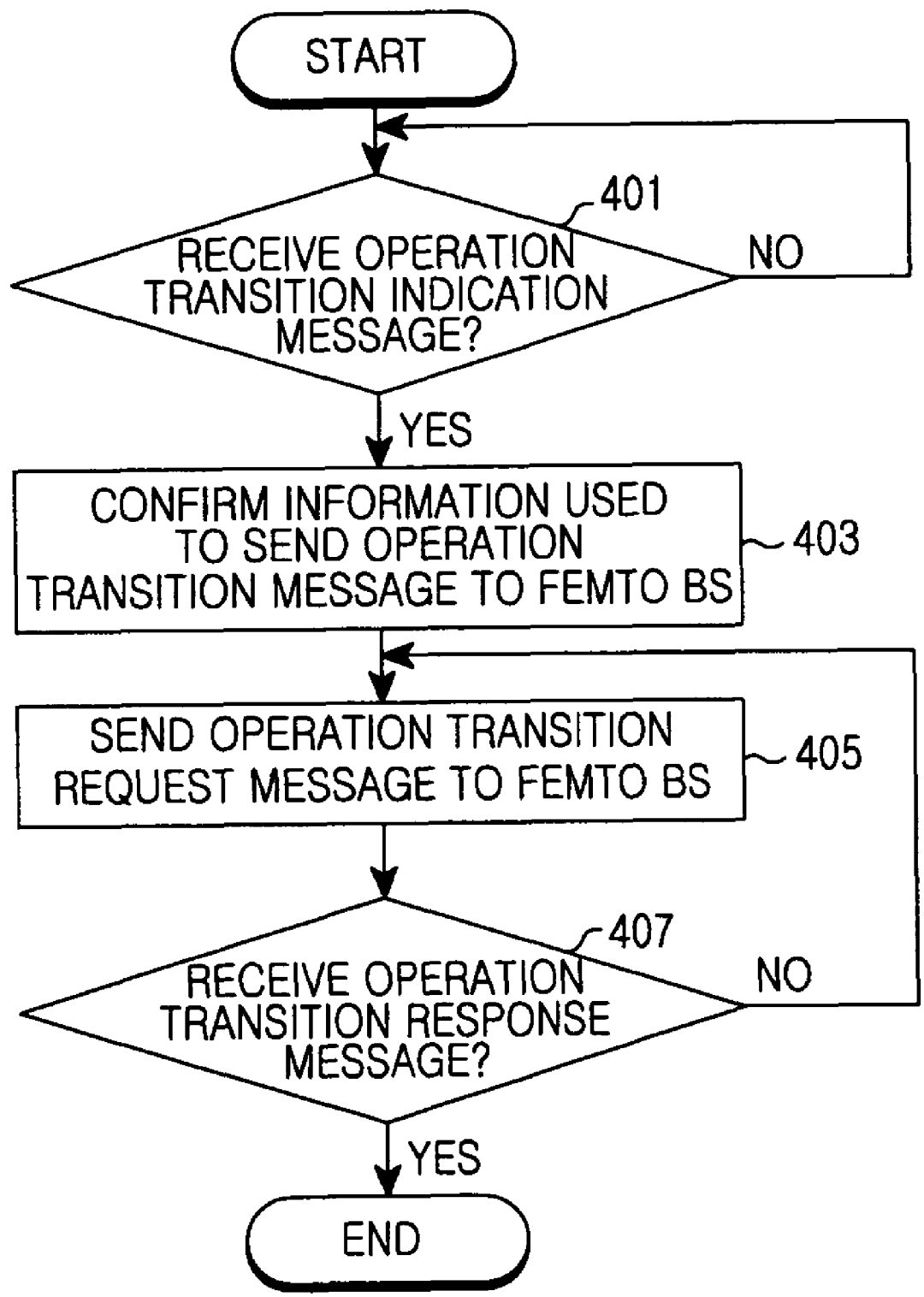
FIG. 4 illustrates a method of the terminal for transiting the femto base station to the active mode in the wireless communication system according to an exemplary embodiment of the present invention.

When the macro base station sends the message instructing the operation transition of the femto base station of the sleep mode as above, the terminal receiving the message operates as shown in FIG. 4.

FIG. 4 is a flowchart of a method of the terminal for transiting the femto base station to the active mode in the wireless communication system according to an exemplary embodiment of the present invention. Hereafter, the terminal periodically transmits its location information to the macro base station. Yet, when the macro base station is able to estimate the location information of the terminal, the terminal may not transmit its location information to the macro base station.

In step 401, the terminal confirms whether the operation transition indication message of the femto base station is received from the macro base station.

When receiving the operation transition indication message from the macro base station, the terminal confirms the information used to send the operation transition request message to the femto base station of the sleep mode, from the operation transition indication message in step 403. Herein, the information used to send the operation transition request message includes the uplink resource information, the transmission timing information, the transmit power information, and the dedication access preamble information. When the terminal accesses to the femto base station using the random access, the information used to deliver the operation transition request message does not include the dedication access preamble. When the femto base station is in the second sleep mode, the information used to deliver the operation transition request message does not include the transmission timing information.

In step 405, the terminal sends the operation transition request message to the sleeping femto base station using the information acquired in step 403. For example, when the femto base station is in the first sleep mode, the terminal sends the operation transition request message to the femto base station using the uplink resource information, the transmission timing information, and the transmit power information according to the random access scheme. By contrast, according to the dedication access scheme, the terminal sends the operation transition request message to the femto base station using the uplink resource information, the transmission timing information, the transmit power information, and the dedication access preamble information. Additionally and alternatively, when the femto base station is in the second sleep mode, the terminal may send the operation transition request message to the femto base station using the uplink resource information and the transmit power information according to the random access. According to the dedication access, the terminal may send the operation transition request message to the femto base station using the uplink resource information, the transmit power information, and the dedication access preamble information.

In step 407, the terminal confirms whether an operation transition response message is received from the femto base station or not.

When receiving no operation transition response message within the reference time, the terminal goes back to step 405 and retransmits the operation transition request message to the femto base station. The terminal retransmits the operation transition request message up to the number of times of the reference retransmission.

When receiving the operation transition response message within the reference time, the terminal recognizes that the femto base station enters the active mode.

Next, the terminal finishes this process.

Now, the operations of the femto base station for transiting to the active mode under the control of the terminal are explained.

Figure 5:
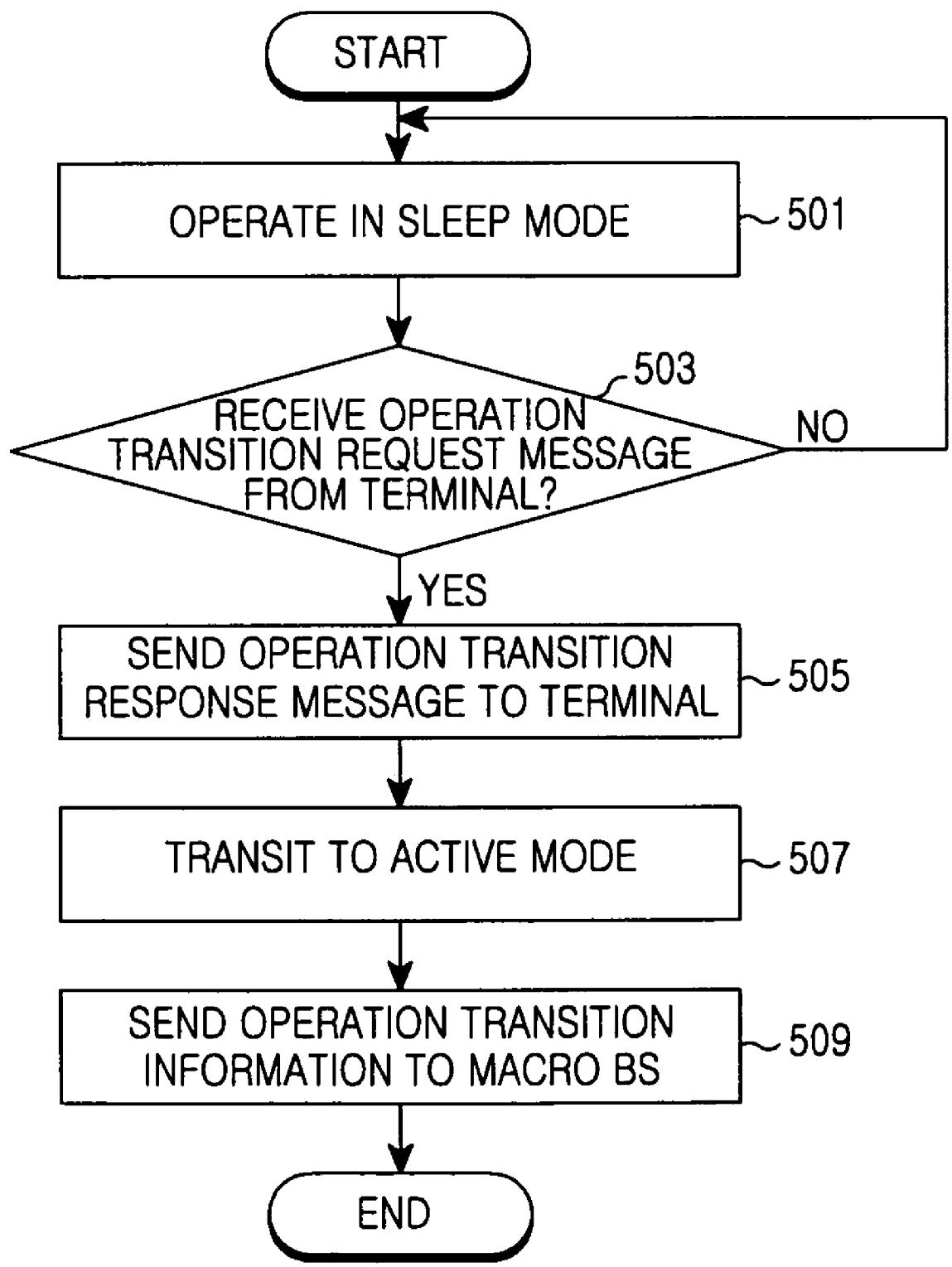
FIG. 5 illustrates a method of the femto base station for transiting to the active mode in the wireless communication system according to an exemplary embodiment of the present invention.

FIG. 5 illustrates a flowchart a method of the femto base station for transiting to the active mode in the wireless communication system according to an exemplary embodiment of the present invention.

In step 501, the femto base station enters the sleep mode to save the power when there exist no accessed terminal and accessible terminal over the reference time. For example, the femto base station enters the sleep mode through the negotiation with the macro base station as shown in FIG. 2.

In step 503, the femto base station confirms whether the operation transition request message is received from its registered terminal. For example, when transiting to the sleep mode, the femto base station sends to the macro base station the information for receiving the operation transition request message. Accordingly, when transiting to the sleep mode, the femto base station confirms whether the operation transition request message is received or not, by taking into account the information transmitted to the macro base station.

When receiving no operation transition request message from the terminal, the femto base station returns to step 501 and sustains the sleep mode.

When receiving the operation transition response message from the terminal, the femto base station sends a response message to the terminal in reply to the operation transition request message in step 505.

In step 507, the femto base station transits to the active mode.

In step 509, the femto base station reports the active mode transition to the macro base station.

Next, the femto base station finishes this process.

In some embodiments, the operations of the macro base station, the terminal, and the femto base station have been described by assuming that the CSG femto base station of the sleep mode is transited to the active mode.

Figure 6:
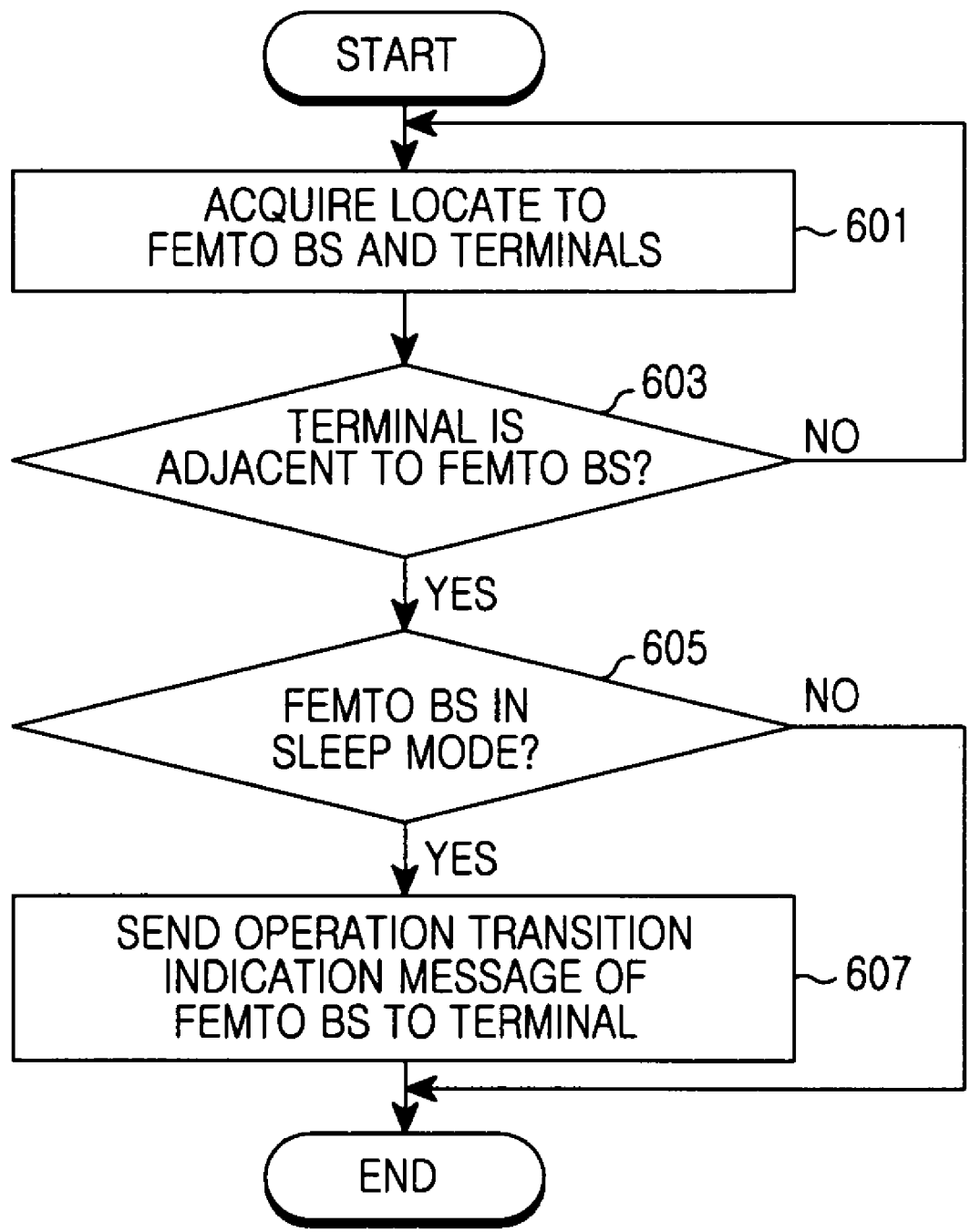
FIG. 6 illustrates a method of a macro base station for transiting the femto base station to the active mode in the wireless communication system according to another exemplary embodiment of the present invention.

In additional embodiments, to transit the open access femto base station of the sleep mode to the active mode, the macro base station operates as shown in FIG. 6.

FIG. 6 illustrates a flowchart of a method of the macro base station for transiting the femto base station to the active mode in the wireless communication system according to another exemplary embodiment of the present invention.

In step 601, the macro base station confirms the location information of the femto base station and the location information of its registered terminals. For example, the macro base station receives the location information from the femto base station and the terminals. Additionally and alternatively, the macro base station may estimate the location information of the terminals.

In step 603, the macro base station confirms whether a terminal exists that travels adjacent to the cell of the femto base station or moves into the cell of the femto base station among its registered terminals.

When there is no terminal traveling adjacent to the cell of the femto base station or entering the cell of the femto base station, the macro base station returns to step 601 and reconfirms the location information of the femto base station and the terminals.

When detecting the terminal traveling adjacent to the cell of the femto base station or entering the cell of the femto base station, the macro base station confirms the operation mode of the femto base station in step 605.

When the femto base station is in the active mode, the macro base station finishes this process. In doing so, the macro base station may control the terminal traveling adjacent to the cell of the femto base station or moving into the cell of the femto base station to hand over to the femto base station.

When the femto base station is in the sleep mode, the macro base station sends a message instructing the operation transition of the femto base station to the terminal that travels adjacent to the cell of the femto base station or moves into the cell of the femto base station in step 607. The message includes information to be used for the terminal to send the operation transition request message to the femto base station of the sleep mode. For example, when the terminal accesses to the femto base station using the dedication access scheme, the message includes uplink resource information, transmission timing information, transmit power information, and dedication access preamble information that are used for the terminal to send the operation transition request message to the femto base station of the first sleep mode. When the terminal accesses to the femto base station using the random access scheme, the message does not include the dedication access preamble. Also, when the femto base station is in the second sleep mode, the message does not include the transmission timing information.

Next, the macro base station finishes this process.

When the macro base station sends the message instructing the operation transition of the femto base station of the sleep mode as above, the terminal receiving the message operates as shown in FIG. 4. Hence, the operations of the terminal for transiting the open access femto base station to the active mode is not illustrated separately.

When the terminal sends the operation transition request message, the femto base station in the sleep mode operates as shown in FIG. 5. The femto base station confirms whether the operation transition request message is received from a certain terminal, rather than its registered terminal, in step 503 of FIG. 5.

A structure of the macro base station for controlling the femto base station in the sleep mode to transit to the active mode under the control of the terminal is now described.

Figure 7:
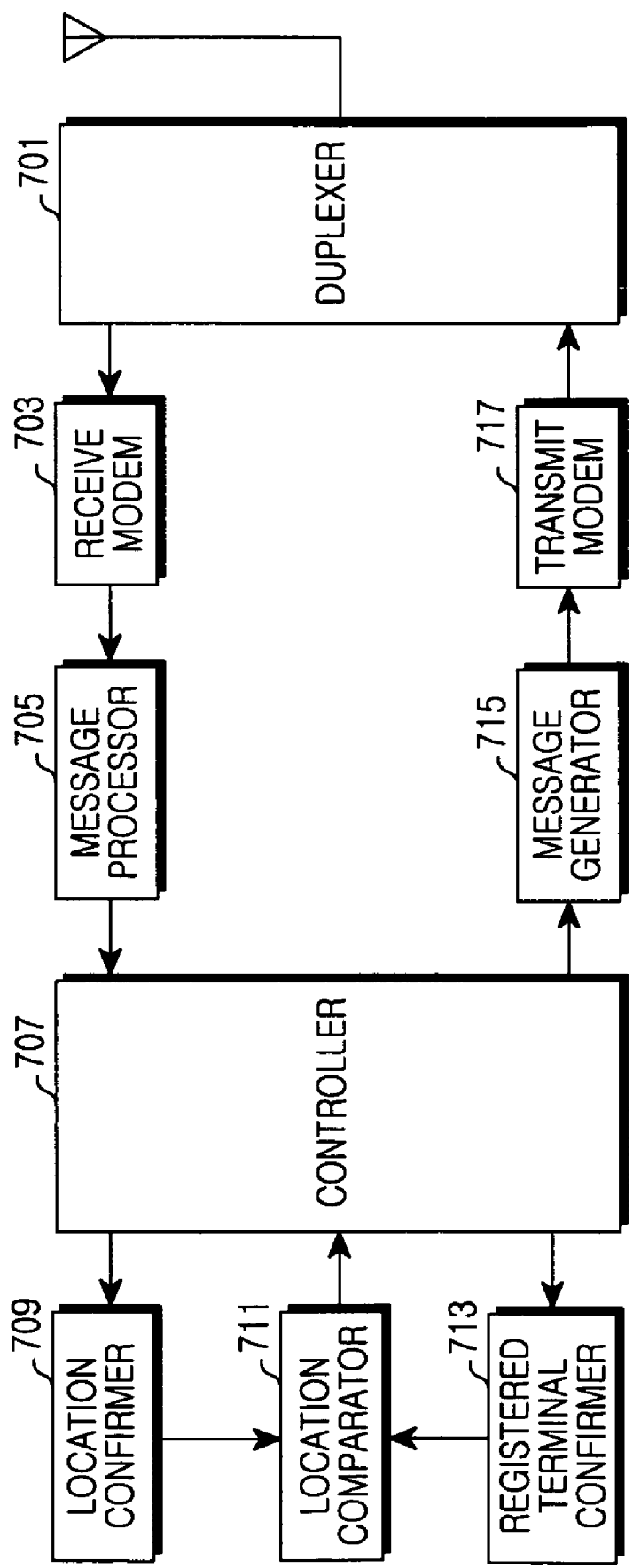
FIG. 7 illustrates the macro base station in the wireless communication system according to an exemplary embodiment of the present invention.

FIG. 7 illustrates a block diagram of the macro base station in the wireless communication system according to an exemplary embodiment of the present invention.

The macro base station of FIG. 7 includes a duplexer 701, a receive modem 703, a message processor 705, a controller 707, a location confirmer 709, a location comparator 711, a registered terminal confirmer 713, a message generator 715, and a transmit modem 717.

The duplexer 701 sends a transmit signal output from the transmit modem 717 over an antenna, and provides a receive signal from the antenna to the receive modem 703 according to the duplexing.

The receive modem 703 restores data from the signal output from the duplexer 701 and outputs the data to the message processor 705. For example, the receive modem 703 includes a Radio Frequency (RF) receiving block, a demodulating block, a channel decoding block, and so forth. The RF receiving block includes a filter and an RF front-end unit. When the wireless communication system adopts an Orthogonal Frequency Division Multiplexing (OFDM) scheme, the demodulating block includes a Fast Fourier Transform (FFT) operator for extracting data from subcarriers. The channel decoding block includes a demodulator, a deinterleaver, and a channel decoder.

The message processor 705 extracts control information from the signal output from the receive modem 703 and outputs the extracted control information to the controller 707. For example, the message processor 705 extracts the initial access request message or the sleep mode transition request message from the femto base stations and outputs the extracted message to the controller 707. The message processor 705 extracts the location information provided from the terminals and outputs the extracted location information to the controller 707.

The controller 707 controls the transmission and the reception of the macro base station.

The controller 707 controls the operation mode of its accessed femto base stations according to the information provided from the message processor 705 and the location comparator 711. For instance, when receiving the initial access request message of the femto base station from the message processor 705, the controller 707 controls performing the initial access procedure with the femto base station. The controller 707 provides the location confirmer 709 with the location information of the femto base station contained in the initial access request message, and provides the registered terminal confirmer 713 with the list of the terminals registered to the femto base station contained in the initial access request message.

When receiving the sleep mode request message from the message processor 705, the controller 707 controls transiting the femto base station sending the sleep mode request message to the sleep mode.

The controller 707 forwards the location information of the terminals, which is provided from the message processor 705, to the location confirmer 709.

Based on the location information of the femto base stations and the terminals provided from the location comparator 711, the controller 707 controls transiting the femto base station of the sleep mode to the active mode. For example, when the terminal exists traveling adjacent to the cell of the femto base station or moving into the cell of the femto base station among the terminals registered to the femto base station, the controller 707 controls sending the message instructing the operation transition of the femto base station to the terminal.

The location confirmer 709 stores the location information of the femto base stations and the terminals provided from the controller 707.

The location confirmer 709 provides the location information of the femto base stations and the location information of the terminals to the location comparator 711.

The registered terminal confirmer 713 stores the list of the terminals registered to the femto base station provided from the controller 707.

The registered terminal confirmer 713 provides the information of the terminals registered to the femto base station to the location comparator 711 under the control of the controller 707.

The location comparator 711 examines whether the terminal exists traveling adjacent to the cell of the femto base station or entering the cell of the femto base station among the terminals registered to the femto base station, using the location information of the femto base stations and the terminals fed from the location confirmer 709 and the information of the terminals registered to the femto base station fed from the registered terminal confirmer 713.

The message processor 715 generates a message to transmit to the femto base station or the terminal under the control of the controller 707. For example, under the control of the controller 707, the message generator 715 generates the message accepting the sleep mode transition of the femto base station. The message generator 715 generates the operation transition indication message that is transmitted to the terminal to instruct the femto base station of the sleep mode to enter the active mode under the control of the controller 707. In so doing, the message generator 715 includes the information used for the terminal to send the operation transition request message to the femto base station of the sleep mode, to the operation transition indication message. For example, the operation transition indication message includes at least one of the uplink resource information, the transmission timing information, the transmit power information, and the dedication access preamble information that are used for the terminal to send the operation transition request message to the sleeping femto base station.

The transmit modem 717 converts the message or the transmit data output from the message generator 715 to a form transmitted using the radio resource, and outputs the converted data to the duplexer 701. For example, the transmit modem 717 includes a channel coding block, a modulating block, an RF transmit block, and so forth. The channel coding block includes a modulator, an interleaver, and a channel encoder. When the wireless communication system adopts the OFDM scheme, the modulating block includes an Inverse FFT (IFFT) operator for mapping the data to the subcarriers. The RF transmit block includes a filter and an RF front-end unit.

As constructed above, the controller 707 controls the message processor 705, the location confirmer 709, the location comparator 711, the registered terminal confirmer 713, and the message generator 715. For example, the controller 707 can function as the message processor 705, the location confirmer 709, the location comparator 711, the registered terminal confirmer 713, and the message generator 715. Herein, the message processor 705, the location confirmer 709, the location comparator 711, the registered terminal confirmer 713, and the message generator 715 are illustrated individually to distinguish their functions. In the actual implementation, the controller 707 can deal with all or part of the message processor 705, the location confirmer 709, the location comparator 711, the registered terminal confirmer 713, and the message generator 715.

So far, the structure of the macro base station for transiting the CSG femto base station of the sleep mode to the active has been described.

Alternatively, to transit the open access femto base station of the sleep mode to the active mode, the macro base station does not include the registered terminal confirmer 713 in FIG. 7. Also, the location comparator 711 examines whether the terminal exists traveling adjacent to the cell of the femto base station or entering the cell of the femto base station among the terminals, by comparing the location information of the femto base stations and the terminals provided from the location confirmer 709.

In the following, a structure of the terminal for controlling the femto base station of the sleep mode to transit to the active mode is explained.

Figure 8:
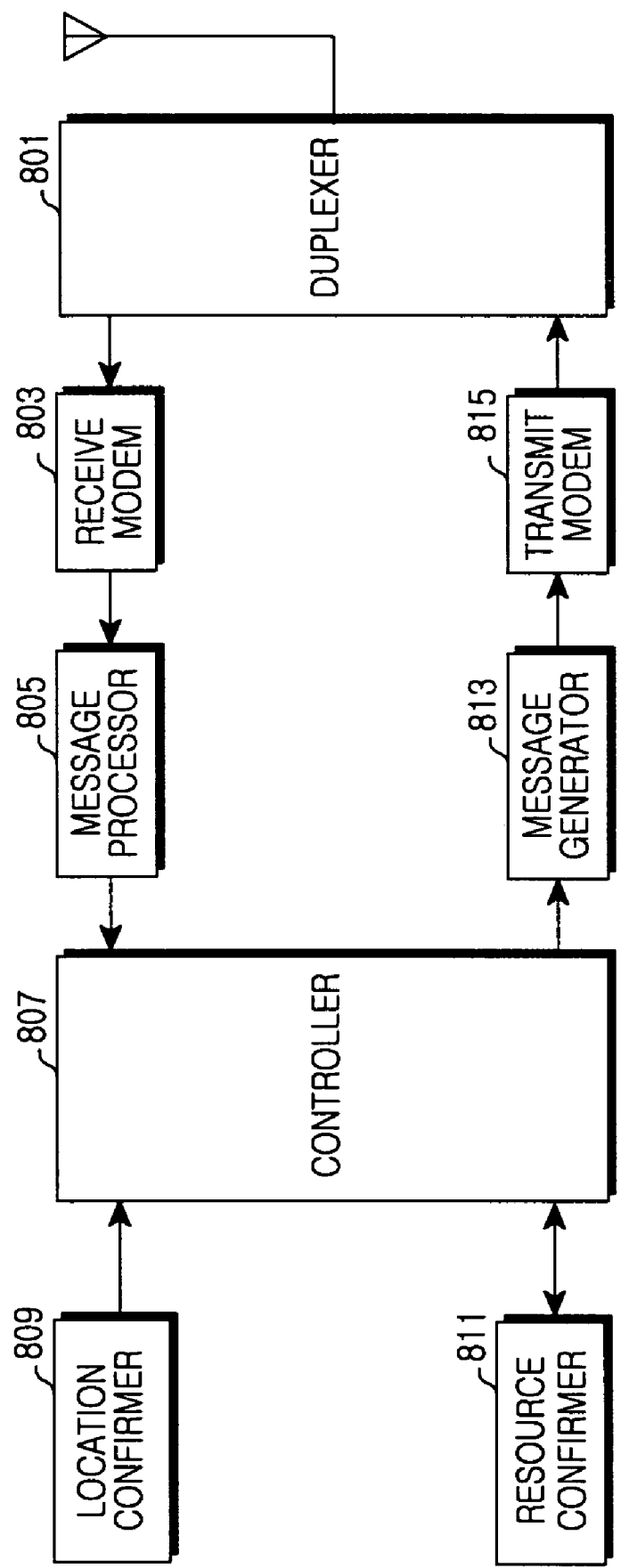
FIG. 8 illustrates the terminal in the wireless communication system according to an exemplary embodiment of the present invention.

FIG. 8 illustrates a block diagram of the terminal in the wireless communication system according to an exemplary embodiment of the present invention.

The terminal of FIG. 8 includes a duplexer 801, a receive modem 803, a message processor 805, a controller 807, a location confirmer 809, a resource confirmer 811, a message generator 813, and a transmit modem 815.

The duplexer 801 sends a transmit signal output from the transmit modem 815 over an antenna, and provides a receive signal from the antenna to the receive modem 803 according to the duplexing.

The receive modem 803 restores data from the signal output from the duplexer 801 and outputs the data to the message processor 805. For example, the receive modem 803 includes an RF receiving block, a demodulating block, a channel decoding block, and so forth. The RF receiving block includes a filter and an RF front-end unit. When the wireless communication system adopts an OFDM scheme, the demodulating block includes an FFT operator for extracting data from subcarriers. The channel decoding block includes a demodulator, a deinterleaver, and a channel decoder.

The message processor 805 extracts the control message from the signal output from the receive modem 803 and outputs the extracted control message to the controller 807. For example, the message processor 805 provides the operation transition indication message received from the macro base station to the controller 807.

The controller 807 controls the transmission and the reception of the terminal.

According to the control message output from the message processor 805, the controller 807 controls transiting the femto base station of the sleep mode to the active mode. For instance, when the operation transition indication message is fed from the message processor 805, the controller 807 controls transiting the sleeping femto base station to the active mode. The controller 807 controls sending the operation transition request message using the information, which is acquired at the resource confirmer 811, used to deliver the operation transition request message to the femto base station of the sleep mode. When the femto base station is in the first sleep mode, the controller 807 controls sending the operation transition request message to the femto base station using the uplink resource information, the transmission timing information, and the transmit power information according to the random access scheme. When the terminal adopts the dedication access, the controller 807 controls sending the operation transition request message to the femto base station using the uplink resource information, the transmission timing information, the transmit power information, and the dedication preamble information. When the femto base station is in the second sleep mode, the controller 807 controls sending the operation transition request message to the femto base station using the uplink resource information and the transmit power information according to the random access scheme. When the terminal adopts the dedication access, the controller 807 controls sending the operation transition request message to the femto base station using the uplink resource information, the transmit power information, and the dedication access preamble information.

The controller 807 controls a periodic transmission of the location information output from the location confirmer 809 to the macro base station. Yet, when the macro base station is able to estimate the location information of the terminal, the controller 807 may control not to transmit the location information output from the location confirmer 809 to the macro base station.

The location confirmer 809 locates the terminal and provides the location to the controller 807.

The resource confirmer 811 confirms the information used to send the operation transition request message to the femto base station of the sleep mode, from the operation transition indication message output from the message processor 805. For example, the information used to deliver the operation transition request message includes the uplink resource information, the transmission timing information, the transmit power information, and the dedication access preamble information. When the terminal accesses to the femto base station using the random access, the information used to deliver the operation transition request message does not include the dedication access preamble. When the femto base station is in the second sleep mode, the information used to deliver the operation transition request does not include the transmission timing information.

Under the control of the controller 807, the message generator 813 generates the message to transmit to the femto base station or the macro base station. For instance, the message generator 813 generates the message including its location information under the control of the controller 807. The message generator 813 generates the operation transition request message to transmit to the femto base station of the sleep mode under the control of the controller 807.

The transmit modem 815 converts the message or the transmit data output from the message generator 813 to a form transmitted using the radio resource, and outputs the converted data to the duplexer 801. For example, the transmit modem 815 includes a channel coding block, a modulating block, an RF transmit block, and so on. The channel coding block includes a modulator, an interleaver, and a channel encoder. When the wireless communication system adopts the OFDM scheme, the modulating block includes an IFFT operator for mapping the data to the subcarriers. The RF transmit block includes a filter and an RF front-end unit.

As constructed above, the controller 807 controls the message processor 805, the location confirmer 809, the resource confirmer 811, and the message generator 813. For example, the controller 807 can function as the message processor 805, the location confirmer 809, the resource confirmer 811, and the message generator 813. Herein, the controller 807 can function as the message processor 805, the location confirmer 809, the resource confirmer 811, and the message generator 813 are illustrated individually to distinguish their functions. In the actual implementation, the controller 807 can handle all or part of the message processor 805, the location confirmer 809, the resource confirmer 811, and the message generator 813.

Now, the structure of the femto base station for entering the active mode under the control of the terminal is illustrated.

Figure 9:
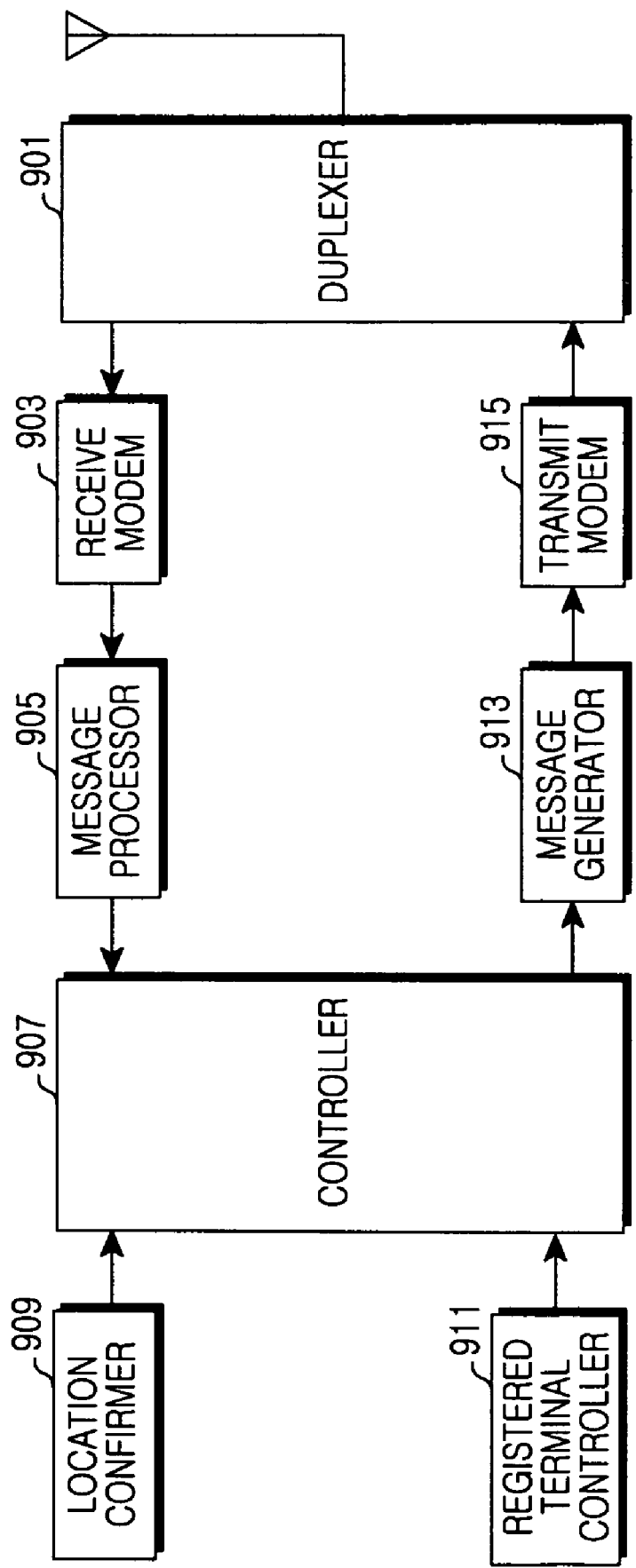
FIG. 9 illustrates the femto base station in the wireless communication system according to an exemplary embodiment of the present invention.

FIG. 9 illustrates a block diagram of the femto base station in the wireless communication system according to an exemplary embodiment of the present invention.

The femto base station of FIG. 9 includes a duplexer 901, a receive modem 903, a message processor 905, a controller 907, a location confirmer 909, a registered terminal controller 911, a message generator 913, and a transmit modem 915.

The duplexer 901 sends a transmit signal output from the transmit modem 915 over an antenna, and provides a receive signal from the antenna to the receive modem 903 according to the duplexing.

The receive modem 903 restores data from the signal output from the duplexer 901 and outputs the data to the message processor 905. For example, the receive modem 903 includes an RF receiving block, a demodulating block, a channel decoding block, and so on. The RF receiving block includes a filter and an RF front-end unit. When the wireless communication system adopts the OFDM scheme, the demodulating block includes an FFT operator for extracting data from subcarriers. The channel decoding block includes a demodulator, a deinterleaver, and a channel decoder.

The message processor 905 extracts the control message from the signal output from the receive modem 903 and outputs the extracted control message to the controller 907. For example, the message processor 905 provides the sleep mode transition response message received from the macro base station, to the controller 907. The message processor 905 provides the operation transition request message received from its registered terminal to the controller 907.

The controller 907 controls the transmission and the reception of the femto base station.

The controller 907 controls the operation mode depending on whether there exist the accessed terminal and the accessible terminal during the reference time. For instance, when there are no the accessed terminal and the accessible terminal over the reference time, the controller 907 controls the process to enter the sleep mode. The controller 907 reports the sleep mode transition to the macro base station, and enters the sleep mode upon receiving the sleep mode transition response message from the message processor 905. Alternatively, when receiving the operation transition request message from its registered terminal through the message processor 905 in the sleep mode, the controller 907 controls the process to enter the active mode.

At the initial access to the macro base station, the controller 907 controls sending its location information output from the location confirmer 909 and the list of its registered terminals output from the registered terminal controller 911, to the macro base station. Every time the location information is changed, the controller 907 controls sending its changed location information to the macro base station.

The location confirmer 909 acquires and provides its location to the controller 907.

The registered terminal controller 911 manages the list of its accessible terminals. The terminal list can be registered and updated by the user who installs or manages the femto base station.

The message generator 913 generates a message to transmit to the macro base station under the control of the controller 907. For example, the message generator 913 generates a message for requesting the initial access to the macro base station under the control of the controller 907. The message for requesting the initial access includes the location information of the femto base station and the list of the terminals registered to the femto base station. The message generator 913 generates the sleep mode transition request message to report the sleep mode transition to the macro base station under the control of the controller 907. The sleep mode transition request message includes at least one of the uplink resource information, the transmission timing information, the transmit power information, and the dedication preamble information that are used for the terminal entering the cell of the femto base station to send the operation transition request message to the femto base station of the sleep mode.

The transmit modem 915 converts the message or the transmit data output from the message generator 915 to a form transmitted using the radio resource, and outputs the converted data to the duplexer 901. For example, the transmit modem 915 includes a channel coding block, a modulating block, an RF transmit block, and so on. The channel coding block includes a modulator, an interleaver, and a channel encoder. When the wireless communication system adopts the OFDM scheme, the modulating block includes an IFFT operator for mapping the data to the subcarriers. The RF transmit block includes a filter and an RF front-end unit.

As constructed above, the controller 907 controls the message processor 905, the location confirmer 909, the registered terminal controller 911, and the message generator 913. In other words, the controller 907 can function as the message processor 905, the location confirmer 909, the registered terminal controller 911, and the message generator 913. The controller 907 can function as the message processor 905, the location confirmer 909, the registered terminal controller 911, and the message generator 913 are illustrated individually to distinguish their functions. In the actual implementation, the controller 907 can handle all or part of the message processor 905, the location confirmer 909, the registered terminal controller 911, and the message generator 913.

In this embodiment, the CSG femto base station entering the active mode under the control of the terminal has been described.

Alternatively, when the femto base station in the sleep mode is the open access femto base station, the femto base station does not include the registered terminal controller 911 in FIG. 9. At the initial access to the macro base station, the controller 907 controls sending its location information fed from the location confirmer 909, to the macro base station.

In the above embodiment, it has been assumed that the femto cell is located within the macro cell.

Figure 10:
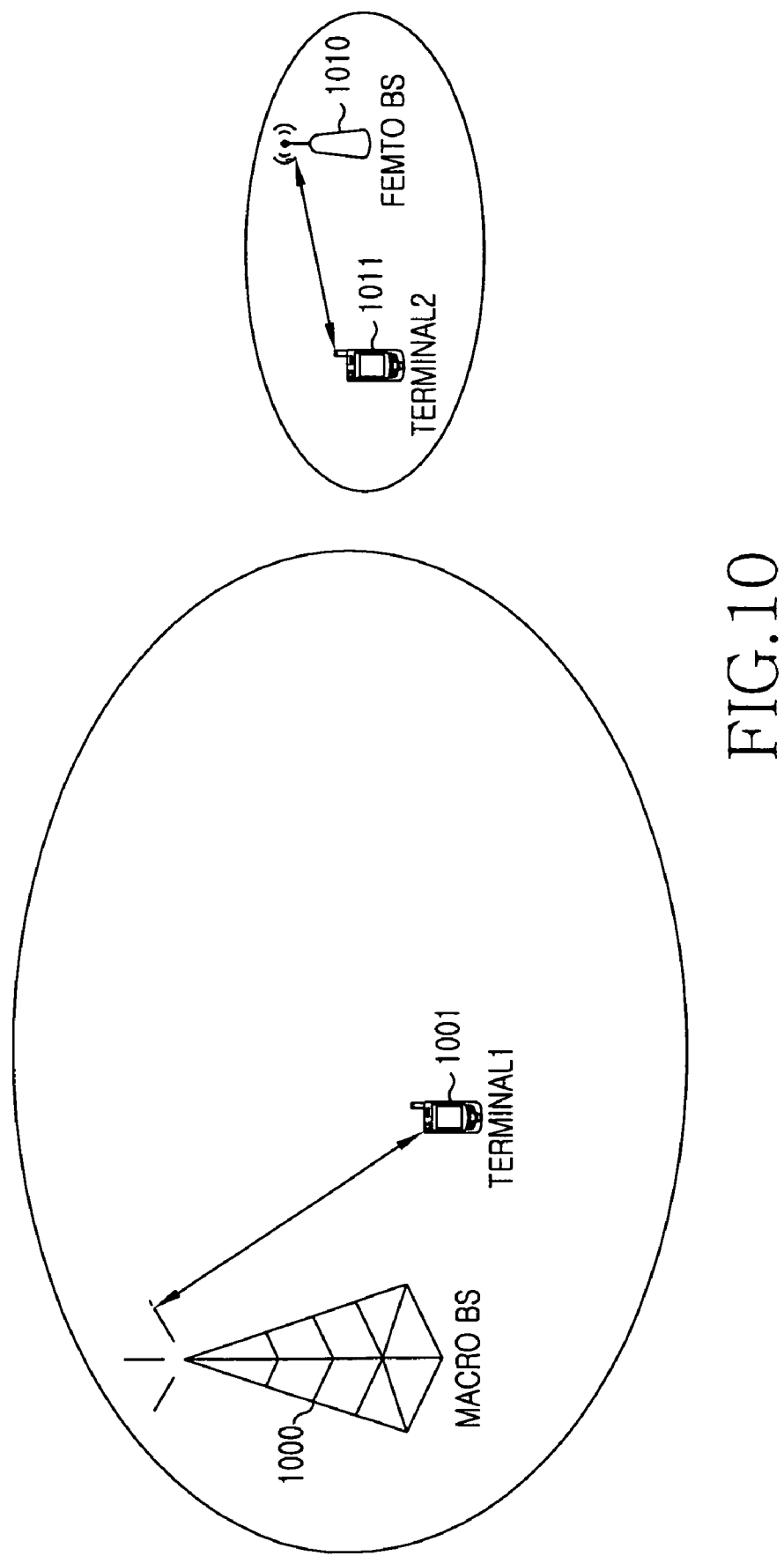
FIG. 10 illustrates a wireless communication system including a femtocell according to another exemplary embodiment of the present invention.

Alternatively, the femto cell may be positioned outside the macro cell as shown in FIG. 10.

FIG. 10 depicts a wireless communication system including a femtocell according to another exemplary embodiment of the present invention.

In FIG. 10, the macro base station 1000 manages one macro cell.

The femto base station 1010 communicates outside the macro cell by accessing the macro base station 1000 over the commercial broadband network.

The first terminal 1001, which travels within the macro cell, communicates by accessing the macro base station 1000. When the first terminal 1001 enters the femto cell, it communicates by accessing the femto base station 1010.

The second terminal 1011, which travels in the femto cell, communicates by accessing the femto base station 1010. When entering the macro cell, the second terminal 1011 communicates by accessing the macro base station 1000.

In some embodiments, the first terminal 1001 and the second terminal 1011, in the femto cell, communicate by accessing the femto base station 1010. In this case, the femto base station 1010 functions as the open access femto base station or the hybrid femto base station.

Alternatively, when the femto base station 1010 is the CSG femto base station, the first terminal 1001 and the second terminal 1011, even in the femto cell, may not be able to access the femto base station 1010 unless they are registered the femto base station 1010.

Figure 11:
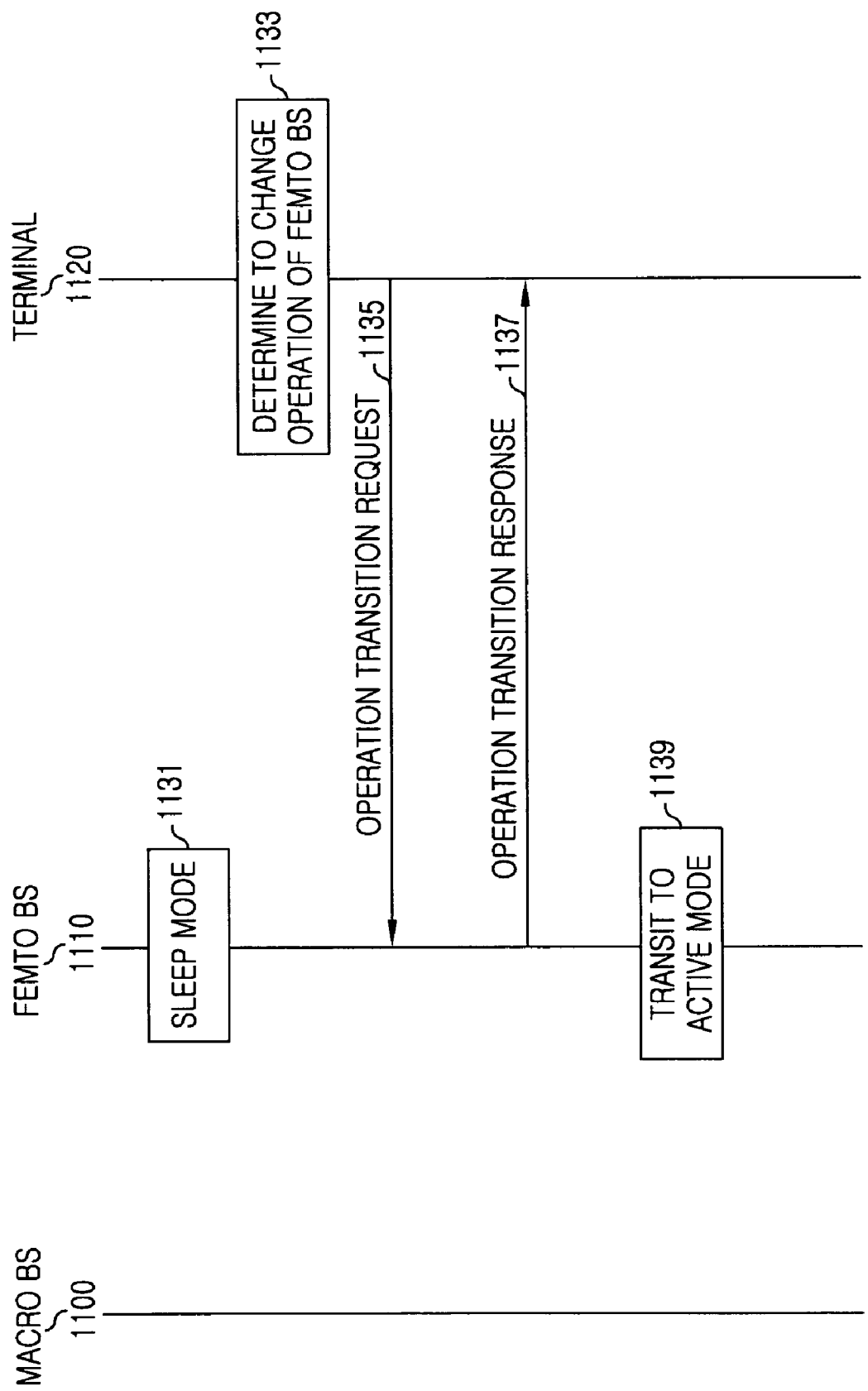
FIG. 11 illustrates an operation transition of the femto base station in the wireless communication system according to another exemplary embodiment of the present invention.

When the femto cell is located outside the macro cell as above, the femto base station transits its operation mode as shown in FIG. 11.

FIG. 11 illustrates the operation transition of the femto base station in the wireless communication system according to another exemplary embodiment of the present invention.

When there is no terminal accessed or accessible over a reference time, the femto base station 1110 enters the sleep mode in step 1131. Since the femto base station 1110 is located outside the macro cell, there is no need to register the location information of the femto base station to the macro cell.

Next, when the first terminal 1120 enters the cell of the femto base station 1110 or travels adjacent to the femto cell, the user of the terminal 1120 manually determines whether to transit the femto base station 1110 of the sleep mode to the active mode or not in step 1133. For example, according to whether the user inputs the active mode transition key or not, the terminal 1120 determines whether to transit the femto base station 1110 of the sleep mode to the active mode. Alternatively, according to the type of a program executed by the user, the terminal 1120 determines whether to transit the sleeping femto base station 1110 to the active mode. That is, when the user drives the program that requires the high-speed data service, the terminal 1120 determines to transit the femto base station 1110 to the active mode.

Upon determining to transit the femto base station 1110 to the active mode, the terminal 1120 requests the operation transition to the femto base station 1110 in step 1135. The terminal 1120 requests the operation transition to the femto base station 1110 using the random access scheme used in the initial access to the femto base station 1110.

When the terminal 1120 requests the operation transition, the femto base station 1110 sends a response signal of the operation transition request to the terminal 1120 in step 1137.

Next, the femto base station 1110 enters the active mode to service the terminal 1120 instep 1139.

In some embodiments, when the femto base station 1110 is the CSG femto base station, the femto base station 1110 enters the sleep mode when no accessed terminal, or accessible terminal, exist over the reference time among its registered terminals.

The following explanation provides the structure of the terminal for controlling the femto base station of the sleep mode to the active mode.

Figure 12:
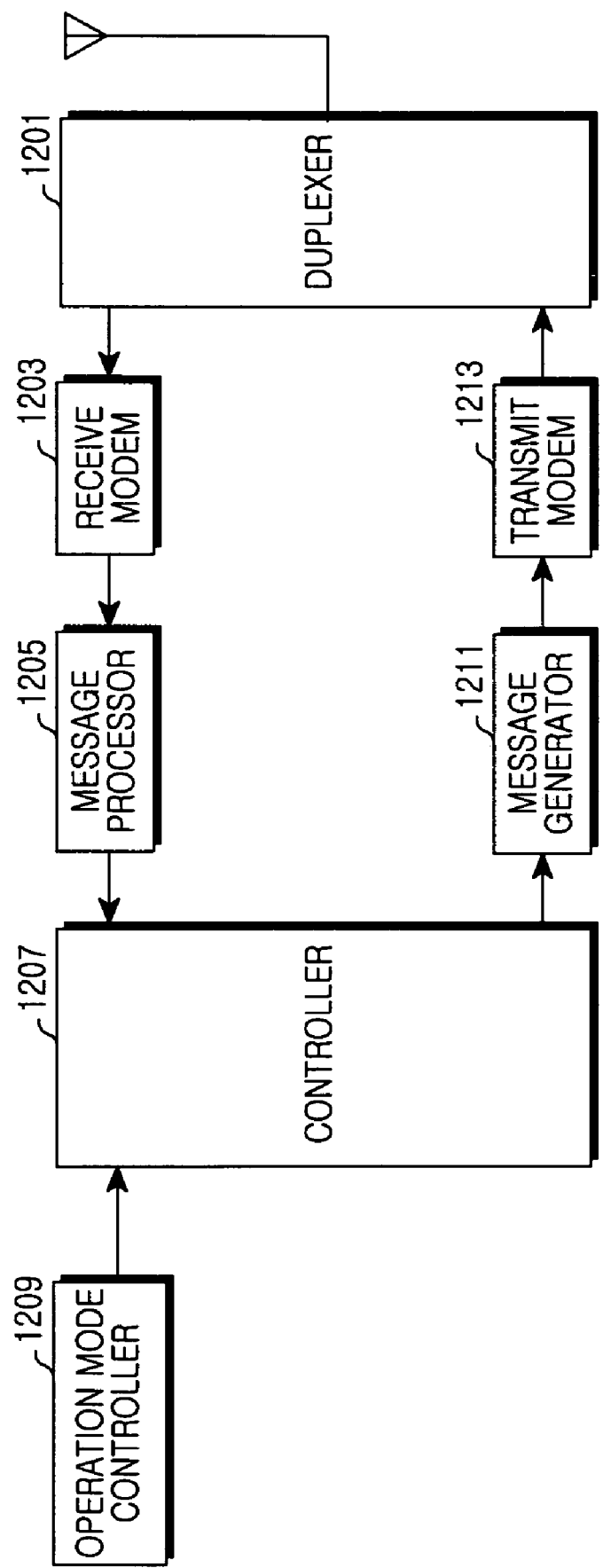
FIG. 12 illustrates the terminal in the wireless communication system according to another exemplary embodiment of the present invention.

FIG. 12 illustrates a block diagram of the terminal in the wireless communication system according to another exemplary embodiment of the present invention.

The terminal of FIG. 12 includes a duplexer 1201, a receive modem 1203, a message processor 1205, a controller 1207, an operation mode controller 1209, a message generator 1211, and a transmit modem 1213.

The duplexer 1201 sends a transmit signal output from the transmit modem 1213 over an antenna, and provides a receive signal from the antenna to the receive modem 1203 according to the duplexing.

The receive modem 1203 restores data from the signal output from the duplexer 1201 and outputs the data to the message processor 1205. For example, the receive modem 1203 includes an RF receiving block, a demodulating block, a channel decoding block, and so on. The RF receiving block includes a filter and an RF front-end unit. When the wireless communication system adopts the OFDM scheme, the demodulating block includes an FFT operator for extracting data from subcarriers. The channel decoding block includes a demodulator, a deinterleaver, and a channel decoder.

The message processor 1205 extracts the control message from the signal output from the receive modem 1203 and outputs the extracted control message to the controller 1207.

The controller 1207 controls the transmission and the reception of the terminal.

Under the control of the operation mode controller 1209, the controller 1207 controls the femto base station in the sleep mode to transit to the active mode.

The operation mode controller 1209 confirms whether the femto base station of the sleep mode enters the active mode, as manually determined by the user of the terminal. For example, depending on whether the user inputs the active mode transition key or not, the operation mode controller 1209 determines whether to transit the sleeping femto base station to the active mode. Alternatively, depending on the type of the program executed by the user, the operation mode controller 1209 determines whether to transit the femto base station of the sleep mode to the active mode. That is, when the user drives the program which requires the high-speed data service, the operation mode controller 1209 determines to transit the femto base station 1110 to the active mode.

Under the control of the controller 1207, the message generator 1211 generates the message to transmit to the femto base station. For example, the message generator 1211 generates the operation transition request message for controlling the sleeping femto base station to transit to the active mode under the control of the controller 1207.

The transmit modem 1213 converts the message or the transmit data output from the message generator 1211 to a form transmitted using the radio resource, and outputs the converted data to the duplexer 1201. For example, the transmit modem 1213 includes a channel coding block, a modulating block, an RF transmit block, and so forth. The channel coding block includes a modulator, an interleaver, and a channel encoder. When the wireless communication system adopts the OFDM scheme, the modulating block includes an IFFT operator for mapping the data to the subcarriers. The RF transmit block includes a filter and an RF front-end unit.

As constituted above, the controller 1207 controls the message processor 1205, the operation mode controller 1209, and the message generator 1211. In other words, the controller 1207 can function as the message processor 1205, the operation mode controller 1209, and the message generator 1211. The message processor 1205, the operation mode controller 1209, and the message generator 1211 are illustrated individually to distinguish their functions. In the actual implementation, the controller 1207 can handle all or part of the message processor 1205, the operation mode controller 1209, and the message generator 1211.

The structure of the femto base station for entering the active mode under the control of the terminal is now described.

Figure 13:
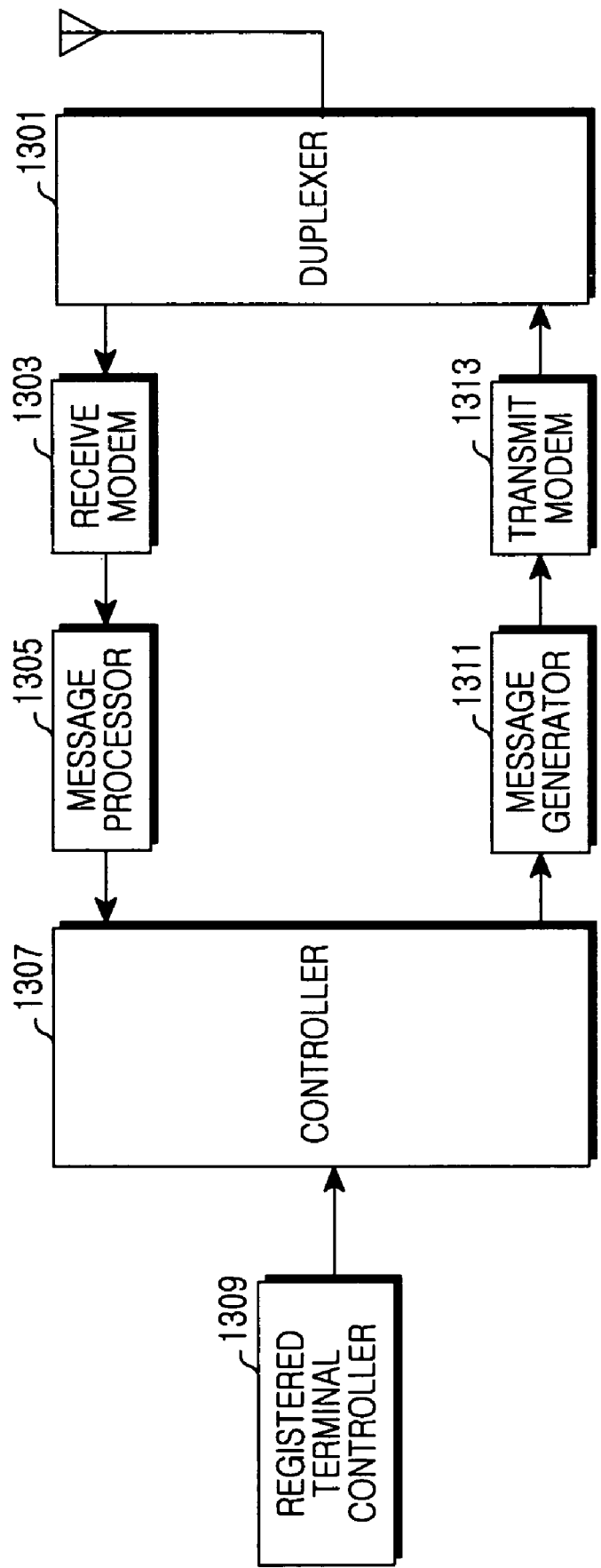
FIG. 13 illustrates the femto base station in the wireless communication system according to another exemplary embodiment of the present invention.

FIG. 13 is a block diagram of the femto base station in the wireless communication system according to another exemplary embodiment of the present invention.

The femto base station of FIG. 13 includes a duplexer 1301, a receive modem 1303, a message processor 1305, a controller 1307, a registered terminal controller 1309, a message generator 1311, and a transmit modem 1313.

The duplexer 1301 sends a transmit signal output from the transmit modem 1313 over an antenna, and provides a receive signal from the antenna to the receive modem 1303 according to the duplexing.

The receive modem 1303 restores data from the signal output from the duplexer 1301 and outputs the data to the message processor 1305. For example, the receive modem 1303 includes an RF receiving block, a demodulating block, a channel decoding block, and so forth. The RF receiving block includes a filter and an RF front-end unit. When the wireless communication system adopts the OFDM scheme, the demodulating block includes an FFT operator for extracting data from subcarriers. The channel decoding block includes a demodulator, a deinterleaver, and a channel decoder.

The message processor 1305 extracts the control message from the signal output from the receive modem 1303 and outputs the extracted control message to the controller 1307. For example, the message processor 1305 provides the operation transition request message received from the terminal to the controller 1307.

The controller 1307 controls the transmission and the reception of the femto base station.

When no accessed terminal, or the accessible terminal, exists over the reference time, the controller 1307 controls the process to enter the sleep mode to save its power.

When receiving the operation transition request message from the message processor 1305 in the sleep mode, the controller 1307 controls the process to enter the active mode.

The registered terminal controller 1309 manages the list of its accessible terminals. The terminal list can be registered and updated by the user who installs or manages the femto base station.

The message generator 1311 generates a message to transmit to its registered terminal under the control of the controller 1307. For instance, the message generator 1311 generates the operation transition response message to transmit to the terminal under the control of the controller 1307.

The transmit modem 1313 converts the message or the transmit data output from the message generator 1311 to a form transmitted using the radio resource, and outputs the converted data to the duplexer 1301. For example, the transmit modem 1313 includes a channel coding block, a modulating block, an RF transmit block, and so forth. The channel coding block includes a modulator, an interleaver, and a channel encoder. When the wireless communication system adopts the OFDM scheme, the modulating block includes an IFFT operator for mapping the data to the subcarriers. The RF transmit block includes a filter and an RF front-end unit.

As constituted above, the controller 1307 controls the message processor 1305, the registered terminal controller 1309, and the message generator 1311. For example, the controller 1307 can function as the message processor 1305, the registered terminal controller 1309, and the message generator

1311. The message processor 1305, the registered terminal controller 1309, and the message generator 1311 are illustrated individually to distinguish their functions. In the actual implementation, the controller 1307 can handle all or part of the message processor 1305, the registered terminal controller 1309, and the message generator 1311.

In the embodiments of the present invention, the macro base station constitutes the operation transition indication information of the femto base station in the form of the message and then transmits the information to the terminal.

Alternatively, the macro base station may constitute the operation transition indication information of the femto base station in the form of a code or a signaling and then transmit the information to the terminal.

In the embodiments of the present invention, the terminal constitutes the operation transition request information of the femto base station in the form of the message and then transmits the information to the femto base station.

Alternatively, the terminal may constitute the operation transition request information of the femto base station in the form of a signature and then transmit the information to the femto base station.

As set forth above, in the wireless communication system, the femto base station having no accessible terminal is transited to the sleep mode and the femto base station in the sleep mode is transited to the active mode under the control of the terminal. Therefore, the power consumption of the femto base station can be reduced and the interference caused by the operation of the femto base station can be mitigated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transitioning to an operation mode of a femto base station in a wireless communication system, the method comprising:
   in a sleep mode, in which the femto base station aborts transmissions, confirming whether operation transition request information is received from at least one terminal; and
   transitioning to an active mode, when receiving the operation transition request information from the terminal.

2. The method of claim 1, wherein the operation transition request information is constituted in a form of either a message or a signature.

3. The method of claim 1, further comprising:
   when transitioning to the active mode, transmitting operation transition response information comprised in the form of either a message or a signature, to the terminal that sends the operation transition request information; and
   sending operation transition information to a macro base station.

4. The method of claim 1, further comprising, after transiting the active mode:
   transitioning to the sleep mode, when there exist no accessed terminal and no accessible terminal within a reference time.

5. A method for transitioning to an mode of a femto base station in a wireless communication system, the method comprising
   in a sleep mode, confirming whether operation transition request information is received from at least one terminal;
   transitioning an active mode, when receiving the operation transition request information from the terminal
   transitioning to the sleep mode, when there exist no accessed terminal and no accessible terminal within a reference time, wherein the transiting to the sleep mode comprises:
      requesting a sleep mode transition to the macro base station, when there exist no accessed terminal and no accessible terminal within the reference time; and
      transitioning to the sleep mode, when receiving a response signal of the sleep mode transition request from the macro base station.

6. The method of claim 5, wherein the requesting of the sleep mode transition comprises:
   sending a sleep mode transition request message, which comprises at least one of uplink resource information, transmission timing information, transmit power information, and dedication access preamble information to be used for the terminal to transmit the operation transition request information to the femto base station of the sleep mode, to the macro base station.

7. A method for controlling an operation mode transition of a femto base station at a macro base station in a wireless communication system, the method comprising:
   acquiring location information of at least one femto base station in a macro cell and at least one terminal in the macro cell;
   confirming an operation mode of the femto base station, when there exists a terminal traveling in a cell of the femto base station or adjacent to the cell of the femto base station among the at least one terminal; and
   when the femto base station is in a sleep mode, instructing the terminal traveling in the cell of the femto base station or adjacent to the cell of the femto base station, to transit the operation mode of the femto base station.

8. The method of claim 7, wherein the confirming of the operation mode of the femto base station comprises:
   confirming an operation mode of the corresponding femto base station, when a terminal registered to the femto base station among the at least one terminal travels in the cell of the corresponding femto base station or adjacent to the cell of the corresponding femto base station.

9. The method of claim 7, wherein the instructing of the operation mode transition comprises:
   sending operation mode transition indication information constituted in the form of a message, a code, or a signaling, to the terminal traveling in the cell of the femto base station or adjacent to the cell of the femto base station.

10. The method of claim 7, wherein the instructing of the operation mode transition comprises:
    constituting an operation transition indication message that comprises at least one of uplink resource information, transmission timing information, transmit power information, and dedication access preamble information to be used for the terminal traveling in the cell of the femto base station or adjacent to the cell of the femto base station to transmit operation transition request information to the femto base station of the sleep mode, when the femto base station is in the sleep mode; and
    sending the operation transition indication message to the terminal.

11. The method of claim 10, wherein the at least one information contained in the operation transition indication message is acquired from a message transmitted by the femto base station to request a sleep mode transition.

12. A method for controlling an operation mode transition of a femto base station at a terminal in a wireless communication system, the method comprising:
- determining whether to transit the femto base station of a sleep mode, in which the femto base station aborts transmissions, to an active mode; and
- transmitting an operation transition request information to a corresponding femto base station, when determining to transition to the femto base station to the active mode.

13. The method of claim 12, wherein the transmitting of the operation transition request information to the femto base station comprises:
- transmitting the operation transition request information to the femto base station using either a dedication access scheme or a random access scheme.

14. A method for controlling an operation mode transition of a femto base station at a terminal in a wireless communication system, the method comprising:
- determining whether to transit the femto base station of a sleep mode to an active mode according to whether a signal instructing the active mode transition of the femto base station is received from a macro base station; and
- transmitting an operation transition request information to a corresponding femto base station, when determining to transition the femto base station to the active mode.

15. A method for controlling an operation mode transition of a femto base station at a terminal in a wireless communication system, the method comprising:
- determining whether to transit the femto base station of a sleep mode to an active mode by considering input of an active mode transition key or a type of a program executed; and
- transmitting an operation transition request information to a corresponding femto base station, when determining to transition the femto base station to the active mode.

16. An apparatus of a femto base station for transiting an operation mode in a wireless communication system, the apparatus comprising:
- a receiver configured to receive a signal using a radio resource;
- a transmitter configured to send a signal using a radio resource; and
- a controller configured to transition the apparatus to an active mode when an operation transition request information is received from at least one terminal through the receiver in a sleep mode in which the transmitter aborts transmissions.

17. The apparatus of claim 16, wherein the receiver, in the sleep mode, receives the operation transition request information from the at least one terminal, the information constituted in a form of a message or a signature.

18. The apparatus of claim 16, wherein the transmitter, when transiting the active mode, transmits operation transition response information constituted in the form of either a message or a signature, to the terminal which sends the operation transition request information under the control of the controller, and transmits operation transition information to a macro base station under the control of the controller.

19. The apparatus of claim 16, wherein the controller, after transitioning to the active mode, when there exist no accessed terminal and no accessible terminal over a reference time, controls transiting to the sleep mode.

20. The apparatus of claim 16, further comprising:
- a registered terminal controller configured to manage terminals registered to provide a service.

21. An apparatus of a femto base station for transiting an operation mode in a wireless communication system, the apparatus comprising:
- a receiver configured to receive a signal using a radio resource;
- a transmitter configured to send a signal using a radio resource; and
- a controller configured to transit to an active mode when operation transition request information is received from at least one terminal through the receiver in a sleep mode, wherein the controller, after transitioning to the active mode, when there exist no accessed terminal and no accessible terminal over a reference time, controls transition to the sleep mode and wherein the transmitter, after the controller determines to transition to the sleep mode, sends a sleep mode transition request message, which comprises at least one of uplink resource information, transmission timing information, transmit power information, and dedication access preamble information to be used for the terminal to transmit the operation transition request information to the femto base station of the sleep mode, to the macro base station under the control of the controller.

22. An apparatus of a macro base station for controlling an operation mode transition of a femto base station in a wireless communication system, the apparatus comprising:
- a location information confirmer configured to acquire location information of at least one femto base station in a macro cell and at least one terminal in the macro cell;
- a location comparator configured to compare the location information of the femto base station with the location information of the terminal;
- a controller configured to, when there exists a terminal traveling in a cell of the femto base station or adjacent to the cell of the femto base station among the at least one terminal, instruct an operation mode transition of the femto base station to the terminal; and
- a transmitter configured to send operation mode transition indication message of the femto base station to the terminal under the control of the controller.

23. The apparatus of claim 22, wherein, when a terminal registered to the femto base station among the at least one terminal travels in the cell of the corresponding femto base station or adjacent to the cell of the corresponding femto base station, the controller confirms an operation mode of the femto base station, and
- when the femto base station is in a sleep mode, the controller instructs the operation mode transition of the femto base station to the terminal.

24. The apparatus of claim 22, wherein the transmitter sends operation mode transition indication information constituted in the form of a message, a code, or a signaling, to the terminal traveling in the cell of the femto base station or adjacent to the cell of the femto base station under the control of the controller.

25. The apparatus of claim 22, wherein the transmitter constitutes an operation transition indication message that comprises at least one of uplink resource information, transmission timing information, transmit power information, and dedication access preamble information to be used for the terminal traveling in the cell of the femto base station or adjacent to the cell of the femto base station to transmit operation transition request information to the femto base station of the sleep mode, and transmits the operation transition indication message to the terminal under the control of the controller.

26. An apparatus of a terminal for controlling an operation mode transition of a femto base station in a wireless communication system, the apparatus comprising:
- a receiver configured to receive a signal;
- a controller configured to determine whether to transit the femto base station of a sleep mode, in which the femto base station aborts transmissions, to an active mode; and
- a transmitter configured to, when the controller determines to transition the femto base station to the active mode, transmit an operation transition request information to a corresponding femto base station.

27. The apparatus of claim 26, wherein the controller controls transmitting the operation transition request information to the femto base station using either a dedication access scheme or a random access scheme.

28. An apparatus of a terminal for controlling an operation mode transition of a femto base station in a wireless communication system, the apparatus comprising
- a receiver configured to receive a signal;
- a controller configured to determine whether to transit the femto base station of a sleep mode to an active mode, wherein the controller determines whether to transition the femto base station to the active mode or not according to whether a signal instructing the active mode transition of the femto base station is received from a macro base station through the receiver; and
- a transmitter configured to, when the controller determines to transition the femto base station to the active mode, transmit an operation transition request information to a corresponding femto base station.

29. An apparatus of a terminal for controlling an operation mode transition of a femto base station in a wireless communication system, the apparatus comprising:
- a receiver configured to receive a signal;
- a controller configured to determine whether to transition the femto base station of a sleep mode to an active mode, wherein the controller determines whether to transit the femto base station to the active mode or not by considering input of an active mode transition key or a type of a program executed; and
- a transmitter configured to when the controller determines to transition the femto base station to the active mode, transmit an operation transition request information to a corresponding femto base station.

* * * * *